US 9,269,163 B2

(12) United States Patent
Le Floch (10) Patent No.: US 9,269,163 B2
(45) Date of Patent: Feb. 23, 2016

(54) METHOD AND APPARATUS FOR COMPRESSING OR DECOMPRESSING LIGHT FIELD IMAGES

(71) Applicant: CANON KABUSHIKI KAISHA, Tokyo (JP)

(72) Inventor: Hervé Le Floch, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 13/929,347

(22) Filed: Jun. 27, 2013

(65) Prior Publication Data

US 2014/0003732 A1    Jan. 2, 2014

(30) Foreign Application Priority Data

Jun. 28, 2012    (GB) .................................. 1211500.2

(51) Int. Cl.
*G06K 9/36* (2006.01)
*G06T 9/00* (2006.01)
*H04N 19/597* (2014.01)
*H04N 19/625* (2014.01)

(52) U.S. Cl.
CPC .............. *G06T 9/007* (2013.01); *H04N 19/597* (2014.11); *H04N 19/625* (2014.11)

(58) Field of Classification Search
None
See application file for complete search history.

(56) References Cited

U.S. PATENT DOCUMENTS

| 6,097,394 | A  | * | 8/2000 | Levoy et al. ................... 345/419 |
| 7,881,715 | B2 | * | 2/2011 | Kirani et al. ................ 455/426.1 |
| 2006/0159359 | A1 | * | 7/2006 | Lee ................................ 382/240 |
| 2008/0193026 | A1 | * | 8/2008 | Horie et al. ..................... 382/238 |
| 2009/0238482 | A1 | * | 9/2009 | Kim et al. ...................... 382/238 |
| 2009/0268970 | A1 |   | 10/2009 | Babacan et al. |
| 2010/0103175 | A1 |   | 4/2010 | Okutomi et al. |
| 2011/0069755 | A1 | * | 3/2011 | Bethge et al. ............ 375/240.03 |

FOREIGN PATENT DOCUMENTS

EP    2114072 A1    4/2009

OTHER PUBLICATIONS

Ren NG, Digital Light Field Photography, Ph.D Distertation submitted to Stanford University, Jul. 2006, Stanford, CA, http://www.lytro.com/renng-thesis.pdf (Retrieved on Jun. 20, 2013). 203 pages.
Edward H. Adelson, John Y. A. Wang, Single Lens Stereo with a Plenoptic Camera, IEEE Transactions on Pattern Analysis and Machine Intelligence, Feb. 1992, 4(2):99-106, IEEE Computer Soceity, Los Alamitos, CA. , pp. 99-106.

* cited by examiner

*Primary Examiner* — Eueng-Nan Yeh
(74) *Attorney, Agent, or Firm* — Canon U.S.A., Inc. IP Division (57) ABSTRACT

A method for compressing a set of images comprising a plenoptic image and at least one refocused image obtained from the plenoptic image for a given focus, by generating a set of data comprising a compressed version of the plenoptic image, some focusing parameter to build a refocused image from this plenoptic image and a compressed residual data to restore the refocused image in its plain quality.
Accordingly, the set of images can be compressed in an efficient way, preserving the quality of the shoot using the focus chosen by the photographer.

21 Claims, 9 Drawing Sheets

METHOD AND APPARATUS FOR COMPRESSING OR DECOMPRESSING LIGHT FIELD IMAGES

REFERENCE TO RELATED APPLICATIONS

This application claims the priority benefit under 35 U.S.C. §119(e) of GB Application No. 1211500.2, filed on Jun. 28, 2012. The text of this application is incorporated by reference in its entirety.

BACKGROUND OF THE INVENTION

The present invention concerns a method and a device for compressing and decompressing light field images and more particularly a plenoptic image from a light field camera capture and a refocused image computed from it.

A light field camera, also called a plenoptic camera, is a camera that uses a microlens array to capture four dimensional light field information about a scene. Light field cameras may also be composed of multiple traditional cameras instead of using a microlens array.

A light field camera system provides a set of sub-images. These images are usually integrated into a single image. This single image is called the light field image or the plenoptic image. As this single image is composed of highly correlated sub-images, the single image can be compressed in an efficient way. For example, the images from the plenoptic camera may be compressed by using vector quantization. Other compression algorithms could be used. The single image composed of the multiple sub-images will be called the plenoptic image herein.

The main advantage of such light field cameras is that it is possible to compute from the plenoptic image an image in which the focus can be arbitrarily chosen. After shooting, the photographer can choose the focus, try several, and obtain images of the same scene with different focus. An image obtained for a given focus from a plenoptic image will be called a refocused image herein.

Typically, at the time of shooting, a plenoptic image is obtained. Based on this plenoptic image, the photographer can obtain a refocused image by post-processing. This refocused image can be obtained directly on the camera (for example, the photographer chooses directly an area of interest on the screen of the camera for triggering the refocusing algorithm) or on a personal computer when the plenoptic picture is loaded. This refocused image corresponds to the choice of the photographer for the generation of the refocused image. Therefore, it is desirable to consider the set of images constituting the plenoptic image as the result of the shoot and the refocused image as the result of the post-processing process. It would be advantageous to obtain an efficient method to compress both the plenoptic image and the refocused image.

SUMMARY OF THE INVENTION

The present invention has been devised to address one or more of the foregoing concerns.

According to a first aspect of the invention there is provided a method comprising obtaining a compressed plenoptic image generated by compressing an original plenoptic image; obtaining a refocusing parameter; obtaining residual data corresponding to difference between first refocused image and second refocused image, wherein the first refocused image is generated from the original plenoptic image using the refocusing parameter and the second refocused image is generated from a decompressed plenoptic image using the refocusing parameter, the decompressed plenoptic image being generated by decompressing the compressed plenoptic image; and outputting data comprising the compressed plenoptic image, the residual data and the refocusing parameter.

Accordingly the plenoptic image and the refocused one are compressed with a high compression ratio, taken advantage of the relation between these two images while preserving the high quality of the refocused image.

In an embodiment, the outputted residual data is compressed.

In an embodiment the method further comprises storing in a memory outputted data.

In an embodiment of the invention the plenoptic image is compressed using vector quantization.

In an embodiment of the invention the original plenoptic image is compressed using an algorithm based on the use of anchor.

In an embodiment the method further comprises computing a depth map and/or disparity map of the original plenoptic image and computing the refocusing parameters from that map and from refocusing user parameters. Accordingly, the user is able to choose the focus.

In an embodiment of the invention a block DCT transformation algorithm is used to compress the residual data.

In an embodiment of the invention a quantization algorithm is used to compress the residual data.

In an embodiment of the invention an entropy encoding algorithm is used to compress the residual data.

According to a second aspect of the invention there is provided a method comprising obtaining a compressed plenoptic image generated by compressing an original plenoptic image; obtaining a refocusing parameter; obtaining residual data corresponding to difference between first refocused image and second refocused image, wherein the first refocused image is generated from the original plenoptic image using the refocusing parameter and the second refocused image is generated from a decompressed plenoptic image using the refocusing parameter, the decompressed plenoptic image being generated by decompressing the compressed plenoptic image; and generating a refocused image using the compressed plenoptic image, the residual data and the refocusing parameter.

According to a third aspect of the invention there is provided a computing device comprising: an obtaining module for obtaining a compressed plenoptic image generated by compressing an original plenoptic image; an obtaining module for obtaining a refocusing parameter; an obtaining module for obtaining residual data corresponding to difference between first refocused image and second refocused image, wherein the first refocused image is generated from the original plenoptic image using the refocusing parameter and the second refocused image is generated from a decompressed plenoptic image using the refocusing parameter, the decompressed plenoptic image being generated by decompressing the compressed plenoptic image; an outputting module for outputting data comprising the compressed plenoptic image, the residual data and the refocusing parameter.

The device may include a compressing module for the compression of the outputted residual data.

The device may include a storing module for the storage in a memory of the outputted data.

The compressing module for the compression of the plenoptic image may be using vector quantization.

The compressing module for the compression of the original plenoptic image may be using an algorithm based on the use of anchor.

The device may include a computing module for the generation of a depth map and/or disparity map of the original plenoptic image and a computing module for the generation of the refocusing parameters from that map and from refocusing user parameters.

A block DCT transformation algorithm may be used to compress the residual data.

A quantization algorithm may be used to compress the residual data.

An entropy encoding algorithm may be used to compress the residual data.

According to a fourth aspect of the invention there is provided a computing device comprising: an obtaining module for obtaining a compressed plenoptic image generated by compressing an original plenoptic image; an obtaining module for obtaining a refocusing parameter; an obtaining module for obtaining residual data corresponding to difference between first refocused image and second refocused image, wherein the first refocused image is generated from the original plenoptic image using the refocusing parameter and the second refocused image is generated from a decompressed plenoptic image using the refocusing parameter, the decompressed plenoptic image being generated by decompressing the compressed plenoptic image; a generating module for generating a refocused image using the compressed plenoptic image, the residual data and the refocusing parameter.

According to another aspect of the invention there is provided a non-transitory computer-readable storage medium on which is stored codes of an executable program causing a computer to execute each of the steps of the method described above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device or the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE PREFERRED EMBODIMENT

Multiple cameras are an extension of stereo vision. In stereo vision, two cameras are used for capturing the same scene. In multiple-camera capture, the number of cameras can be much larger. The term multiple cameras mainly refers to two categories. A first category consists in multiple camera systems composed of several regular cameras. A second category consists in multiple camera systems composed of a unique camera but with a micro-lens array inside, or in front of, the camera. Such cameras are usually called plenoptic cameras because they capture a reduced version of the 7D-plenoptic function (reduced to 4 dimensions for real application). In the latter, the plenoptic images could be obtained by both kinds of multiple camera system.

Multiple camera systems are of interest because they provide the ability of creating refocused images by post-processing algorithms. One example of a refocusing algorithm is given in US 2010/0103175 A1. For the purpose of the invention described herein, any kind of refocusing algorithm may be used. For example, the exemplary embodiment uses a refocusing algorithm that consists in calculating the homographic parameters of 3×3 matrices between a basic image and a reference image for a given object plane in 3D space. This 3D object plane is a region of interest (ROI) that can be manually selected. These matrices enable spatial alignment of the pixels of the selected object plane in a unique final image while the other pixels of the images are not aligned. The non-alignment of pixels that are not included in the object plane creates a kind of bokeh (pixel blurring). Such refocusing algorithms are based on the known geometrical property whereby points of the same 3D plane can be aligned or merged between 2D images captured from different points of view under perspective projection by homographic transformation. Other refocusing algorithms can be used by considering simpler geometrical transforms: for example, in the dissertation 'of Ren Ng called Digital Light Field Photography and submitted in July 2006 to the department of computer science and the committee on graduate studies of Standford University in partial fulfillment of the requirements for the degree of doctor of philosophy', a virtual sensor is simulated at a given distance from the main camera lens. In this dissertation, plenoptic images are obtained from a micro-lens camera. The initial plenoptic image is first transformed during the refocusing process into aperture images. Next, from the aperture images, a refocused image is generated at the position of the virtual sensor.

The first observation by the inventors is that the plenoptic image and the refocused ones do not have the same compression requirements. The refocused image should be generated and recorded with a high quality. This image is usually important because the photographer has decided to select it as the best point of view. It is important to save it with a high quality level. On the contrary the plenoptic image is less important because one or more refocused images have already been generated. The plenoptic image may be recorded using a compression rate leading to a lower quality than the one used for the refocused image.

It is therefore advantageous when considering the simultaneous compression of the set of images comprising both the plenoptic image and at least one refocused image to allow a high compression ratio for the plenoptic image and a lower one for the refocused image. The refocused image is compressed with a better quality than the plenoptic one.

The refocused image and the plenoptic image could be stored and compressed independently. However, this way of recording images may be improved in term of compression efficiency by exploiting the relations between the plenoptic image and the refocused one.

Figure 1:
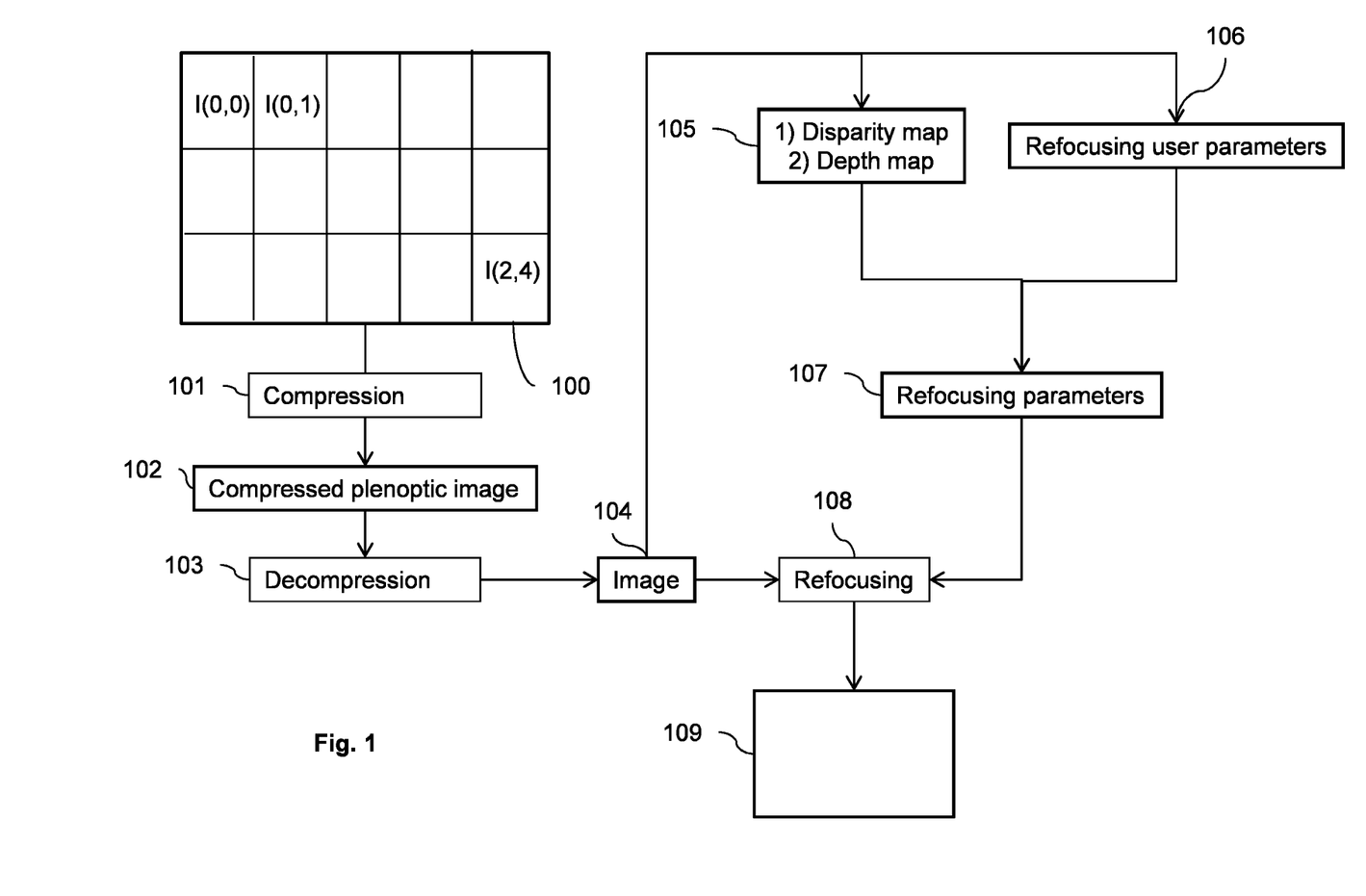
FIG. 1 illustrates a method of computing a refocused image from a plenoptic image.

FIG. 1 details the process for generating a refocused image from a plenoptic one. Several different refocusing algorithms may be used depending on the multiple camera system or plenoptic camera. We do not intend to describe all these algorithms which are known to the person skilled in the art. For example, the refocusing algorithm can be the one described in "Digital Light Field Photography, a dissertation submitted to the department of computer science and the committee on graduate studies of Standford University in partial fulfillment of the requirements for the degree of doctor of philosophy, Ren Ng July 2006" or the one described in US 2010/0103175 A1. A description will now be given of the general behaviour of the overall generation process.

The plenoptic image 100 is obtained from the multi-camera system. This image is composed of several sub-images (I(m,n) in our example with 0≤m<3 and 0≤n<5). Each sub-image can be considered to be obtained from a respective camera if a multi-camera system is used. If a plenoptic system is used, a sub-image can be viewed as an aperture image.

Usually, this image 100 is compressed 101 generating a compressed plenoptic image 102. When a refocused image needs to be generated this compressed image should be decompressed 103 to give the decompressed version 104 of the plenoptic image 100. From this image, which is composed of n×m sub-images, either a disparity map or a depth map can be calculated. The depth map is an image in which each pixel receives the value of the distance between the camera and the respective object represented by that particular pixel. The disparity map is defined by an image where each pixel receives the respective parallax value for that particular pixel, meaning the distance between the reference pixel and the corresponding pixel in another sub-image.

The relationship between the disparity map and the depth map can be established according to the multiple-camera system. For example, if the multiple-camera system is built on a common calibrated camera having the same optical axis and located in the same plane, the depth map is easily computed from the disparity map. If the multiple-camera system is built on a plenoptic camera of type 1.0, the depth map can be calculated as described in "E. H. Adelson and J. Y. A. Wang, Single Lens Stereo with a Plenoptic Camera, IEEE Transactions on Pattern analysis and Machine Intelligence, Vol. 4, No 2, February 1992". One can also imagine a camera system using depth sensors (for example depth sensors called time of flight sensors) for directly estimating the depth map. Even though a 'depth map' is noted in block 105, this depth map is not mandatory for refocusing. A disparity map is sufficient for refocusing with a multi-camera array.

For a multiple-camera system and with the help of the disparity map calculated in 105, the user selects the refocusing user parameters 106. These parameters 106 can be a region of interest or a distance between the main lens and the virtual sensor plane. The selection of the ROI enables retrieval of the refocusing parameters 107 that will be used for refocusing 108 the multi-camera image. In some refocusing algorithms the selection of the virtual sensor-plane makes it possible to know the refocusing parameters 107. In other refocusing algorithms, the refocusing parameters are deduced from the disparity map calculated in 105 and from the user parameters selected in 106. For example, these refocusing parameters may be a set of homographic matrices. In some embodiments, the refocusing parameters are deduced from the distance between the virtual sensor plane and the main lens of the plenoptic camera.

The details of the actual refocusing user parameters may vary from one algorithm to another. In the same way, the detail of the actual refocusing parameters may vary. However, for all algorithms, the user selects certain refocusing user parameters 106 to determine where he wants the focus. From his choice and the map 105, disparity and/or depth, the system computes the actual refocusing parameters 107 needed by the refocusing algorithm 108.

These refocusing parameters make it possible either to geometrically transform each sub-image of the multi-camera array for generating the refocused image or to shear and project pixel values from the sub-aperture images for generating the refocused image. Based on these parameters, the refocused image is generated 109 by a refocusing algorithm 108.

Figure 2:
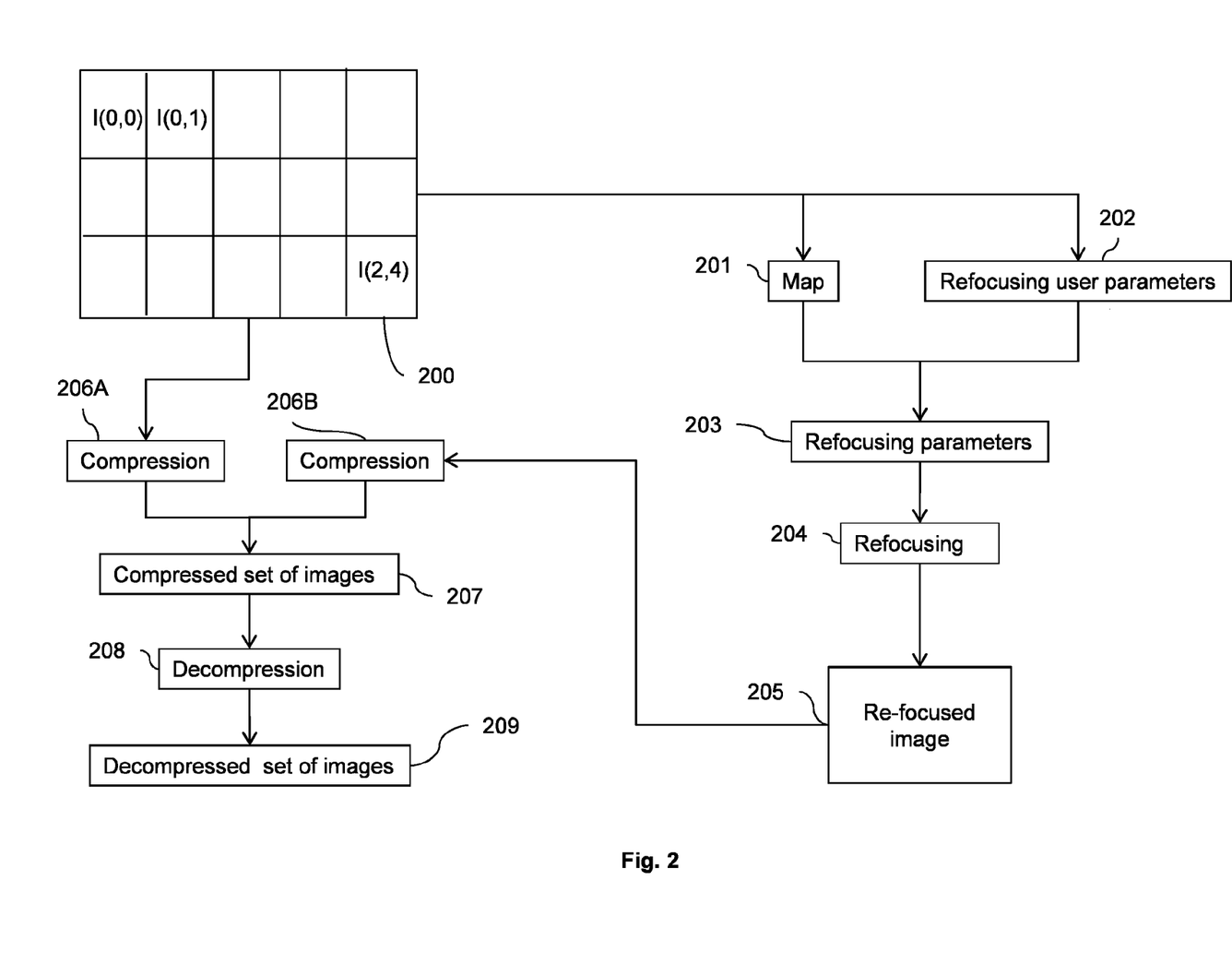
FIG. 2 illustrates a method for compressing a set of images comprising a plenoptic image and a refocused one.

FIG. 2 illustrates a first possible compression method for the set of images comprising the plenoptic image and at least one refocused image. In this method the refocused image is compressed with a high quality while the plenoptic image is compressed with a lower quality. The plenoptic image 200 is generated by the multi-camera system. From this high quality plenoptic image, which has not been compressed, the disparity and/or the depth maps are generated 201. The user can select the parameters 202 to determine the focus. The actual refocusing parameters 203 are generated depending on the actual refocusing algorithm used. This algorithm 204 is used to generate the refocused image 205. At this step, two images are available, the un-compressed plenoptic image 200 and the refocused image 205. Both are of high quality, meaning there is no degradation due to lossy compression. These two images form the set of images.

These two images need to be compressed. Typically, it is desirable to use different algorithms to compress the plenoptic images 200 and the refocused image 205, while this is not mandatory. For example, the refocused image 205 can be compressed with a JPEG compression algorithm 206B using parameters leading to a low compression ratio to get a high quality refocused image.

The plenoptic image 200 is compressed with an algorithm dedicated to plenoptic image compression 206A. In the exemplary embodiment, vector quantization is provided as the algorithm for plenoptic image compression. In another embodiment, the compression algorithm used for the plenoptic image is based on the use of anchor frames. The compressed set of images 207 is composed of two images, the plenoptic image and the refocused image, independently compressed.

This encoded set of image can be decompressed 208 to obtain either the high quality refocused image or the plenoptic image. From the plenoptic image, refocusing is possible but with a lower quality due to artefacts induced by the lossy compression 206A.

Figure 3:
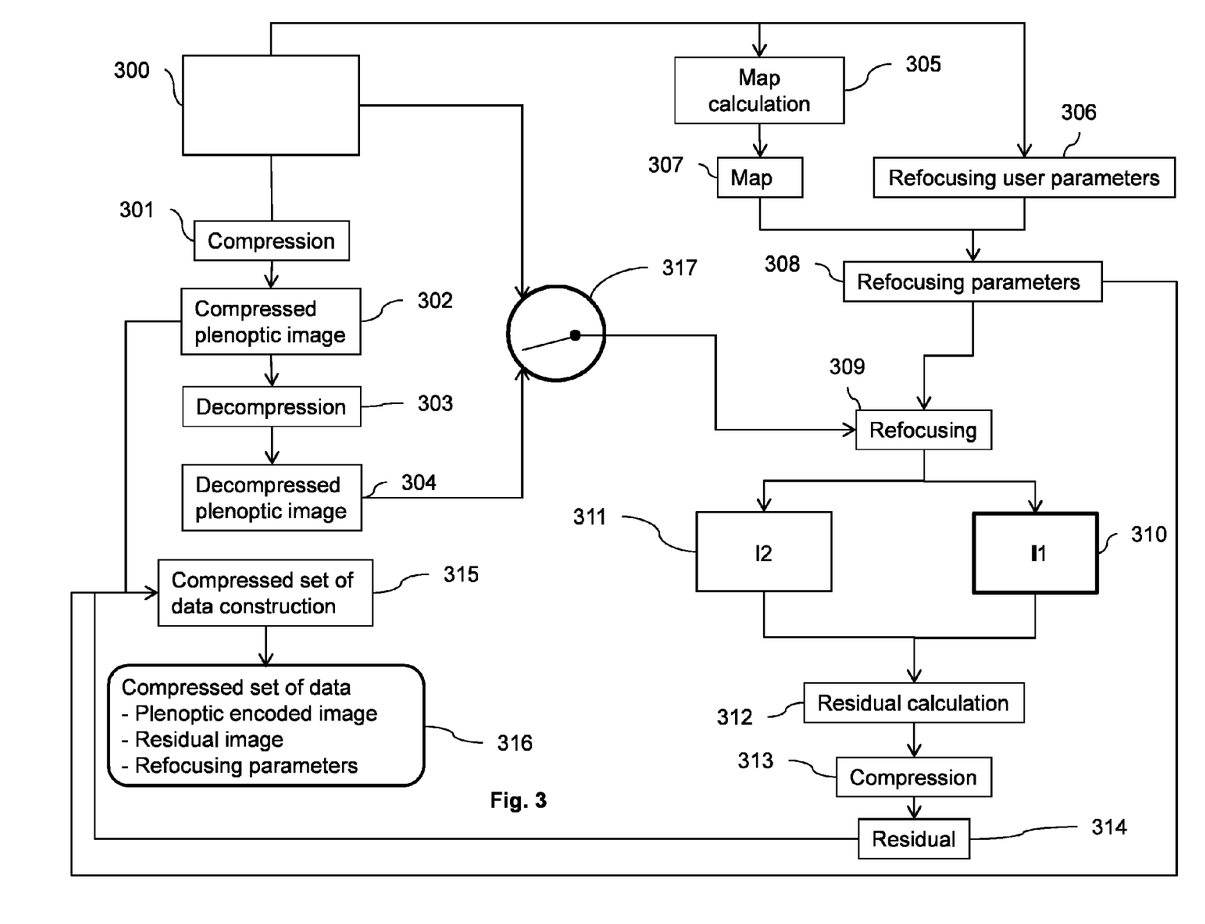
FIG. 3 illustrates a method for compressing a set of images according to an exemplary embodiment of the invention to generate a set of data.

FIG. 3 illustrates an embodiment of the invention. In this embodiment a compression method is adopted which takes advantage of the close relationship between the plenoptic image and the refocused one in the set of images to improve the compression rate. In this embodiment, the refocused image is compressed as a combination of a base layer and a residual data.

The plenoptic image 300 is compressed 301 with compression algorithms dedicated to the plenoptic images as already described. This results in a compressed plenoptic image. This image is called the base layer because it will be used as reference for compressing the refocused image. This base layer is decompressed 303 resulting in the decompressed plenoptic image 304. Due to the use of a lossy compression algorithm, the quality of this image is lower than that of the original plenoptic image 300. In parallel, the disparity map and/or the depth map 307 may be calculated at 305. Still in parallel, the user selects 306 the way of refocusing the plenoptic image 300. In the exemplary embodiment the point selection will be considered as the refocusing user parameter but the distance between the main lens and the virtual sensor plane may also be used, or others. Based on this point selection, the refocusing parameters 308 are generated. These parameters may, for example, be a set of disparity values, a depth value, a set of homographic matrices, or the parameter characterizing the distance between the main lens and the virtual sensor plane. These parameters are used for refocusing 309 a first image 310 from the plenoptic image 300. The refocusing algorithm 309 is run by setting the switch 317 on the image 300. This first image is called I1.

A second refocused image is generated by using the same refocusing parameters 308 but with the decompressed plenoptic image 304. This second image 311 is called I2. The refocusing uses the same algorithm 309 but the switch 317 is configured to provide the decompressed plenoptic image 304 to the input of the refocusing algorithm 309.

The idea here is to store, a set of data 316 comprising the compressed plenoptic image 302 and information to allow the reconstruction of the high quality refocused image since the uncompressed plenoptic image cannot be accessed to generate the high quality refocused image. More precisely, the stored set of data comprises the compressed plenoptic image 302, the refocusing parameters 308 and a residual data 314 being defined by the difference between the refocused image 311 generated from the decompressed plenoptic image 304 and the refocused image 310 generated from the original uncompressed plenoptic image 300. It is assumed that this residual data will stay small and may be compressed in an efficient way.

The process to compute this residual data 314, is described in FIG. 3. A residual data computation 312 is carried out. The residual data is typically a difference between I1 and I2. The result obtained is compressed 313 to give the compressed residual data 314. Any compression algorithm 313 can be used. For example, block-DCT transformation, quantization, or entropy encoding can be used for obtaining the compressed residual data.

The advantage here is that given the compressed version of the plenoptic image, the refocusing parameters and the compressed residual data, it is possible to rebuild the original high quality refocused image. For this neither the uncompressed plenoptic image nor the compressed high quality refocused image is required as was the case in the previously described compression method as illustrated in FIG. 2. Assuming that the size of the refocusing parameters and the compressed residual data is less than the compressed high quality refocused image, the compression ratio obtained by compressing the set of images as a set of data according to the method of FIG. 3 has been improved relatively to the one obtained by the method of FIG. 2.

The output of the compression method according to this embodiment is therefore the set of data 316 consisting of the compressed plenoptic image 302, the compressed residual data 314 and the refocusing parameters 306. The latter may be compressed also in some embodiments, this compression should preferably be lossless.

This set of data 316 may be seen as a compressed version of the set of images comprising the plenoptic image and the refocused one. The two images being compressed with a different compression rate.

Figure 4:
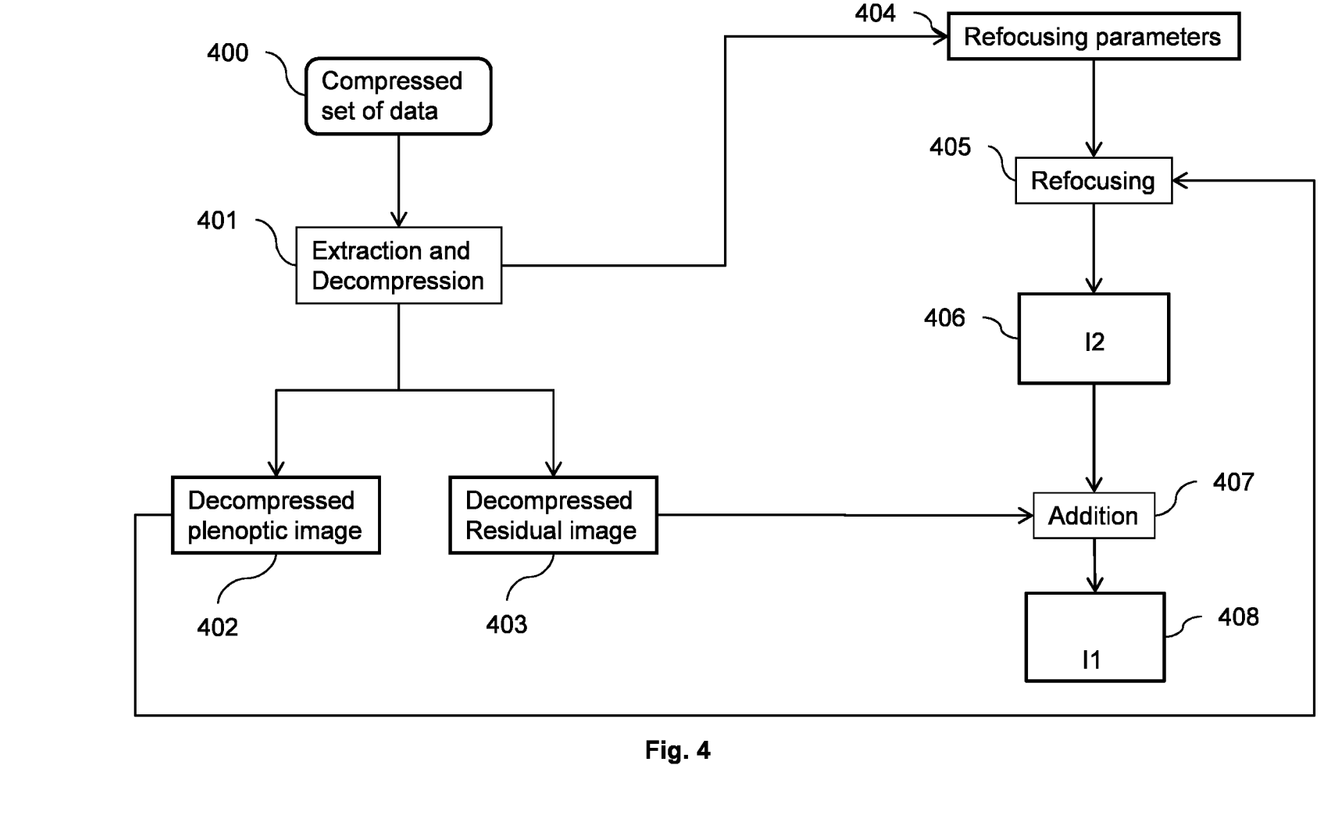
FIG. 4 illustrates a method for decompressing the set of data according to an exemplary embodiment of the invention.

FIG. 4 illustrates a method for decompressing a set of data obtained by the method of FIG. 3 according to an exemplary embodiment of the invention. The set of data to be decompressed is represented using reference 400 corresponding to 316 in FIG. 3. A first step 401 of extraction and decompression is performed to extract each component of the set of data. The compressed components, namely the compressed plenoptic image and the compressed residual data are decompressed. Three components are obtained, i.e. the decompressed plenoptic image 402, the refocusing parameters 404 and the decompressed residual data 403.

A refocused image 406 is generated from the decompressed plenoptic image 402 and the refocusing parameters 404 using a refocusing algorithm 405. The actual refocusing algorithm used here should be the same 309 as was used to generate the refocused images I1 and I2 during the compression process illustrated in FIG. 3. This is to ensure that the refocused image 406 obtained corresponds to the image I2 generated in the compression process.

By adding 407 the residual data to the refocused image 406 the desired image 408 is obtained, corresponding to the high quality refocused image. This image is identical to the image I1 of the compression process of FIG. 3.

This method allows retrieval of the decompressed plenoptic image and the high quality refocused image identically to the data retrieved in the method illustrated on FIG. 2. However this is achieved with a better compression ratio and thus faster than the one obtained in the method illustrated on FIG. 2.

Any step of the algorithm shown in FIGS. 1 to 4 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Figure 5:
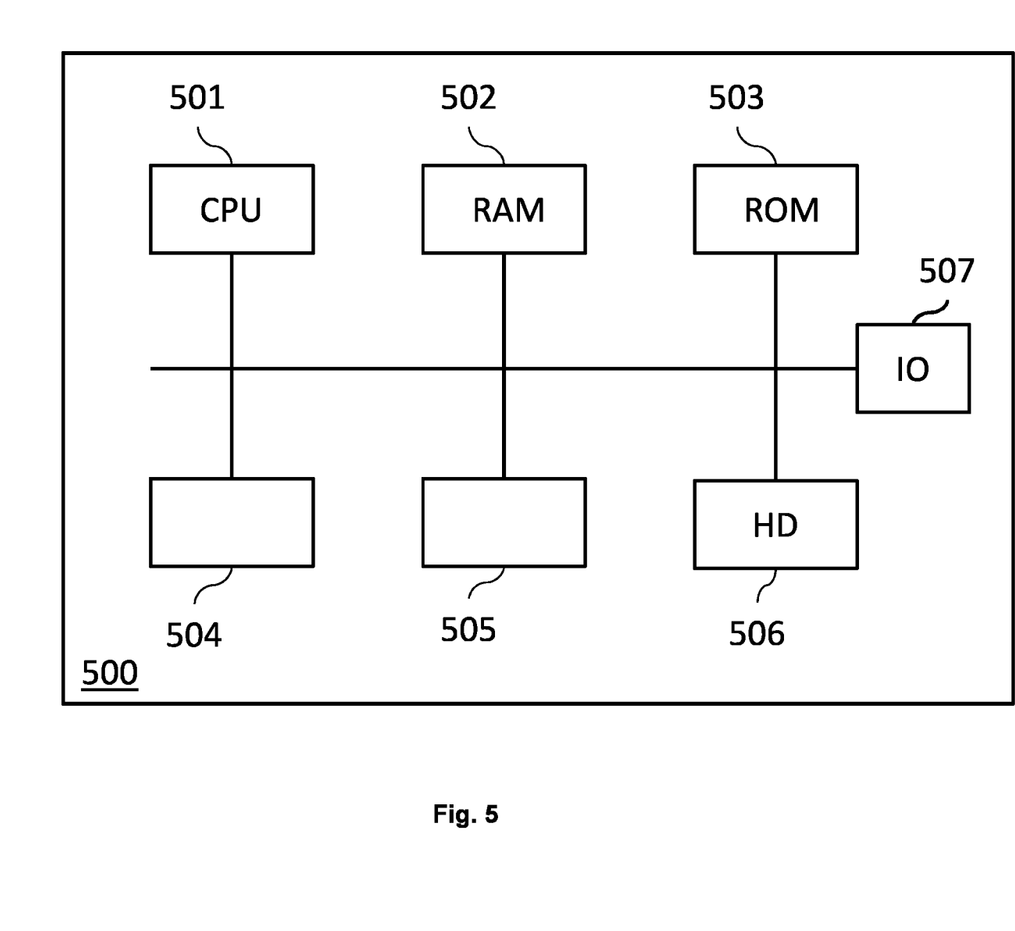
FIG. 5 illustrates a schematic block diagram of a computing device for implementing one or more embodiments of the invention.

FIG. 5 is a schematic block diagram of a computing device 500 for implementation of one or more embodiments of the invention. The computing device 500 may be a device such as a micro-computer, a workstation or a light portable device. The computing device 500 comprises a communication bus connected to:

a central processing unit 501, such as a microprocessor, denoted CPU;

a random access memory 502, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;

a read only memory 503, denoted ROM, for storing computer programs for implementing embodiments of the invention;

a network interface 504 is typically connected to a communication network over which digital data to be processed are transmitted or received. The network interface 504 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 501;

a user interface 505 for receiving inputs from a user or to display information to a user;

a hard disk 506 denoted HD an I/O module 507 for receiving/sending data from/to external devices such as a video source or display The executable code may be stored either in read only memory 503, on the hard disk 506 or on a removable digital medium such as for example a disk. According to a variant, the executable code of the programs can be received by means of a communication network, via the network interface 504, in order to be stored in one of the storage means of the communication device 500, such as the hard disk 506, before being executed.

The central processing unit 501 is adapted to control and direct the execution of the instructions or portions of software code of the program or programs according to embodiments of the invention, which instructions are stored in one of the aforementioned storage means. After powering on, the CPU 501 is capable of executing instructions from main RAM memory 502 relating to a software application after those instructions have been loaded from the program ROM 503 or the hard-disc (HD) 506 for example. Such a software application, when executed by the CPU 201, causes the steps of the flowcharts shown in FIGS. 1 to 4 to be performed.

In this embodiment, the apparatus is a programmable apparatus which uses software to implement the invention. However, alternatively, the present invention may be implemented in hardware (for example, in the form of an Application Specific Integrated Circuit or ASIC).

Figure 6:
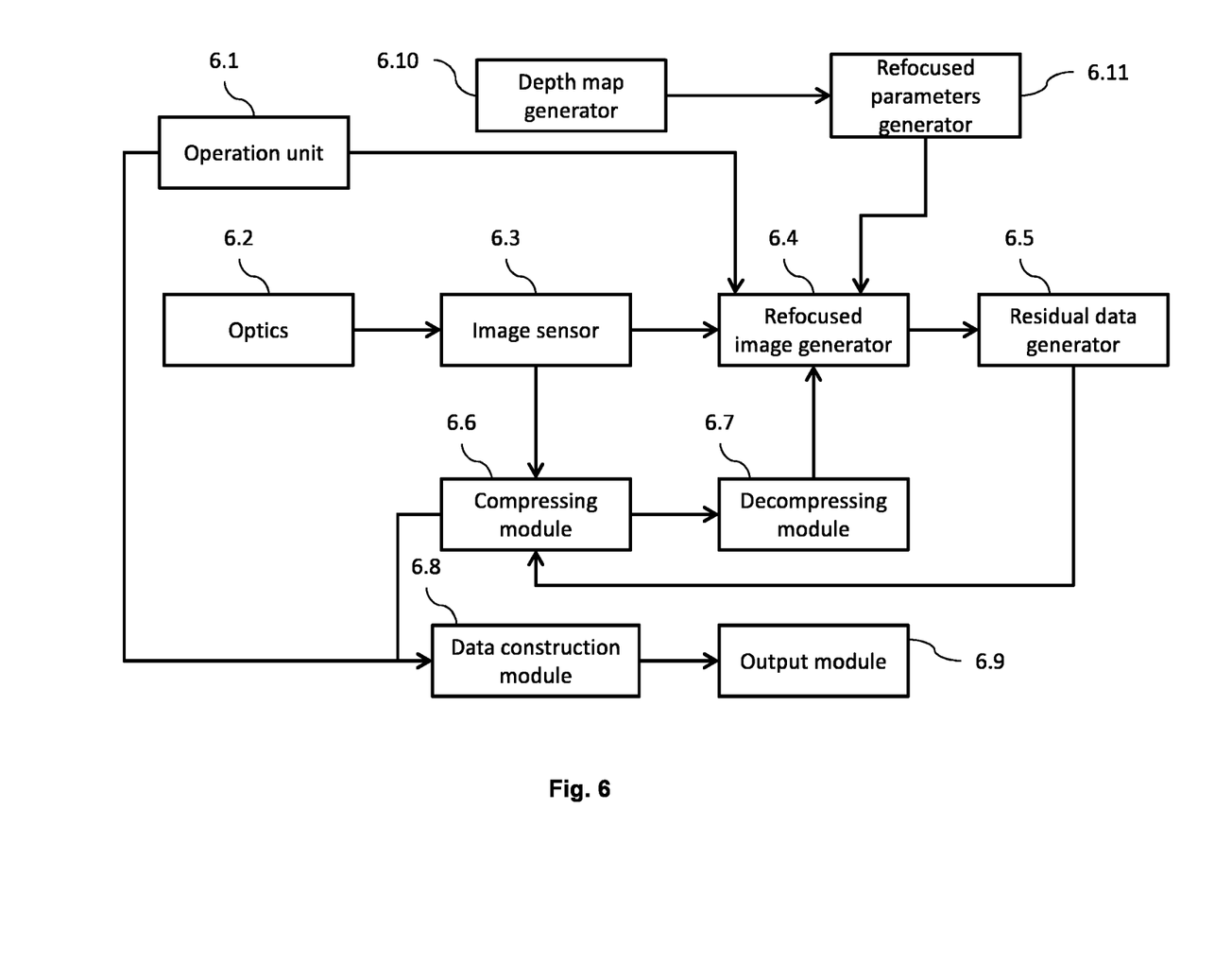
FIG. 6 illustrates the bloc diagram of a compression device according to an embodiment of the invention.

FIG. 6 illustrates the bloc diagram of a compression device according to an embodiment of the invention.

The device operates under the control of an operation unit 6.1. Plenoptic images are captured by the image sensor 6.3 from a scene viewed through the optic 6.2. The plenoptic images are compressed by the compressing module 6.6 and decompressed by the decompressing module 6.7. Refocused images are computed by the refocused image generator 6.4 from a plenoptic images and according to refocusing parameters given by the operation unit 6.1. The residual data generator 6.5 computes the residual data from the refocused images generated by the refocused image generator 6.4. This residual data may be compressed by the compressing module 6.6. The data construction module 6.8 gets the compressed plenoptic image, the compressed residual data and the refocusing parameters to build the set of data to be outputted by the output module 6.9. In some embodiments, the refocusing parameters are computed by a refocused parameters generator 6.11 from a depth or disparity map generated by a depth map generator 6.10.

Figure 7:
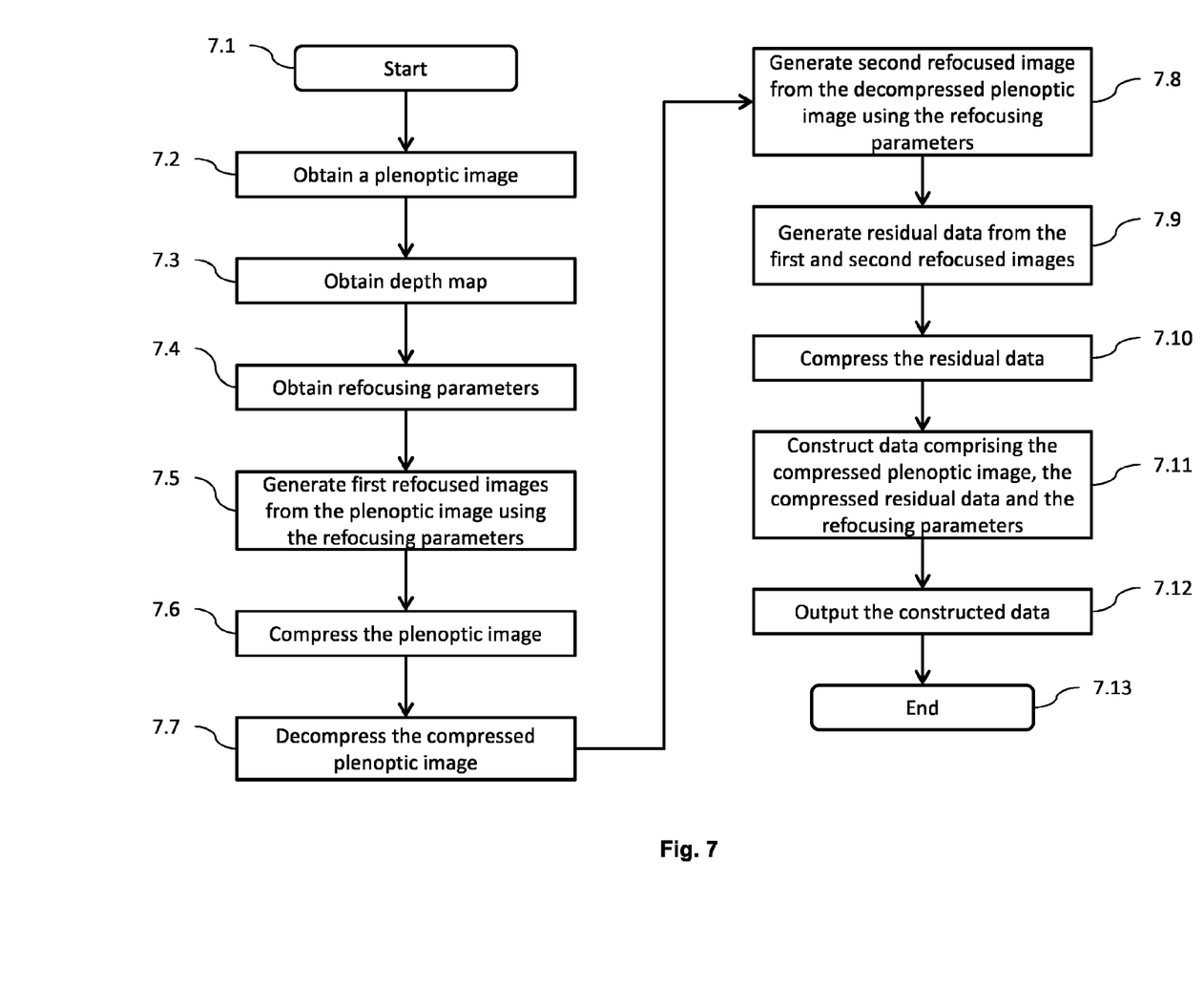
FIG. 7 illustrates the flow chart of a compression method according to an embodiment of the invention.

FIG. 7 illustrates the flow chart of a compression method according to an embodiment of the invention.

The method starts with the starting step 7.1. In a step 7.2 a plenoptic image is obtained, typically from an image sensor. In a step 7.3, optionally a depth or disparity map is generated from the plenoptic image. In a step 7.4 refocusing parameters are obtained. They are typically generated from the depth or disparity map and a user parameter obtained from the user through a user interface. In a step 7.5 a first refocused image is generated from the plenoptic image using the refocusing parameters. In a step 7.6 the plenoptic image is compressed and next decompressed in a step 7.7. In a step 7.8 a second refocused image is generated from the decompressed plenoptic image using the same focusing parameters. In a step 7.9 residual data is generated from the first and the second refocused images, typically being the difference between the two. In a step 7.10 the residual data is compressed. In a step 7.11, data is constructed comprising the compressed plenoptic image, the compressed residual data and the refocusing parameters to be outputted in a step 7.12. Next, the process ends in a step 7.13. In some embodiment, the residual data is outputted uncompressed.

Figure 8:
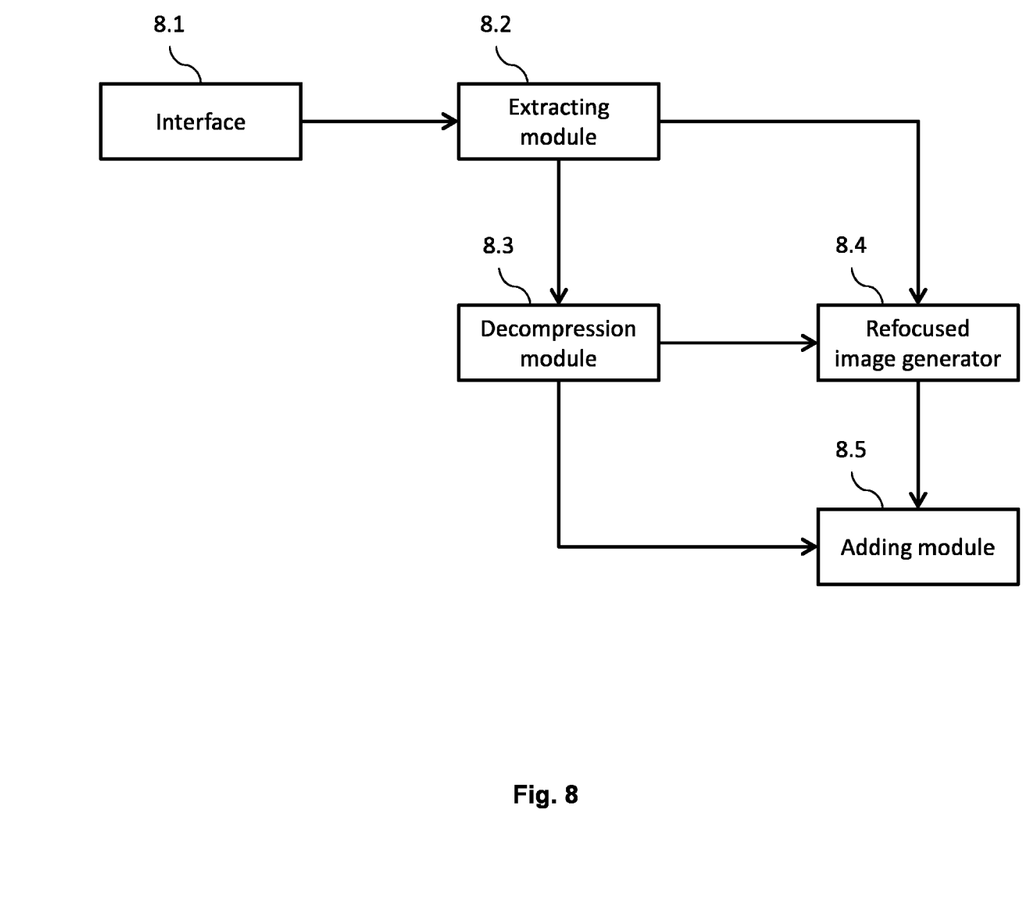
FIG. 8 illustrates the bloc diagram of a decompression device according to an embodiment of the invention.

FIG. 8 illustrates the bloc diagram of a decompression device according to an embodiment of the invention.

The extracting module 8.2 is used to extract the compressed plenoptic image, the compressed residual data and the focusing parameters obtained from an interface 8.1. The compressed plenoptic image and the compressed residual data are decompressed by the decompression module 8.3. The refocused image generator 8.4 generates a refocused image from the decompressed plenoptic image and the refocusing parameters. The adding module 8.5 adds the decompressed residual data to the refocused image.

Figure 9:
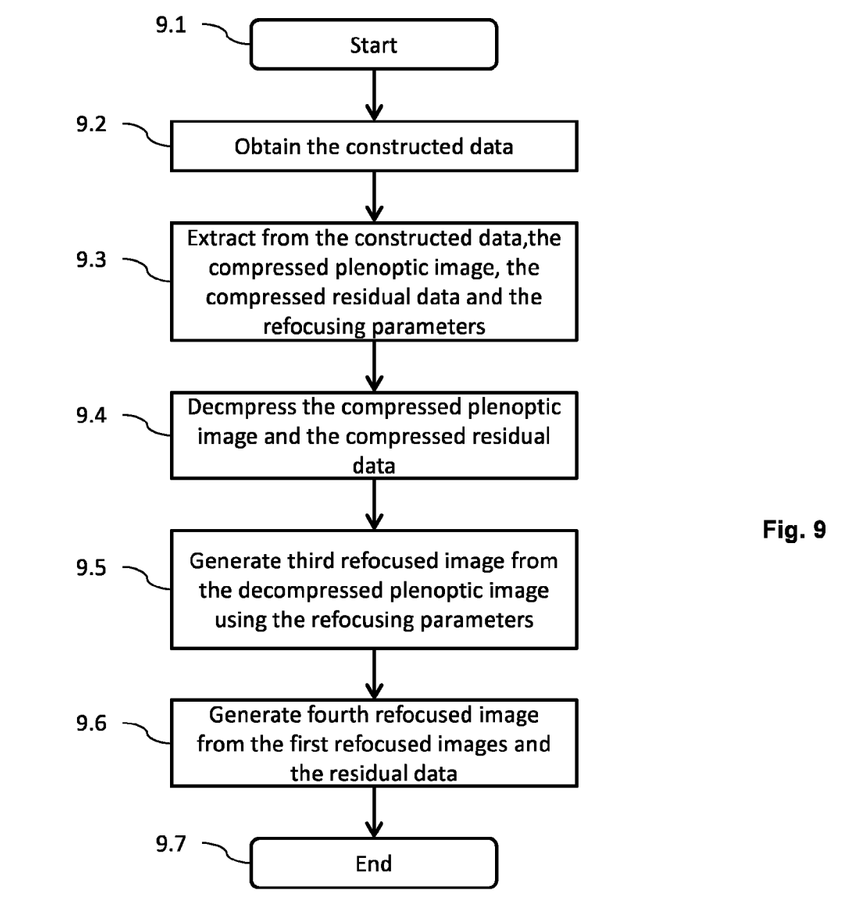
FIG. 9 illustrates the flow chart of a decompression method according to an embodiment of the invention.

FIG. 9 illustrates the flow chart of a decompression method according to an embodiment of the invention.

The method starts with the starting step 9.1. In a step 9.2 the constructed data are obtained. In a step 9.3 the compressed plenoptic image, the compressed residual data and the refocusing parameters are extracted from the constructed data. In a step 9.4 the compressed plenoptic image and the compressed residual data are decompressed. In a step 9.5 a third refocused image is generated from the decompressed plenoptic image using the refocusing parameters. In a step 9.6 a fourth refocused image is generated from the first refocused image and the residual data, typically by adding the residual data to the first refocused image. Next, the process ends at step 9.7.

Although the present invention has been described hereinabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method comprising:
   obtaining a compressed plenoptic image generated by compressing an original plenoptic image;
   obtaining a refocusing parameter;
   generating a first refocused image from the original plenoptic image using the refocusing parameter and generating a second refocused image from a decompressed plenoptic image using the refocusing parameter, the decompressed plenoptic image being obtained from the compressed plenoptic image;
   obtaining residual data corresponding to a difference between the first refocused image and the second refocused image; and
   outputting data comprising the compressed plenoptic image, the residual data and the refocusing parameter.

2. The method according to claim 1, wherein the outputted residual data is compressed.

3. The method according to claim 2, wherein a block DCT transformation algorithm is used to compress the residual data.

4. The method according to claim 2, wherein a quantization algorithm is used to compress the residual data.

5. The method according to claim 2, wherein an entropy encoding algorithm is used to compress the residual data.

6. The method according to claim 1, further comprising:
   storing in a memory outputted data.

7. The method according to claim 1, wherein the original plenoptic image is compressed using vector quantization.

8. The method according to claim 1, wherein the original plenoptic image is compressed using an algorithm that is based on using an anchor.

9. The method according to claim 1, further comprising:
   computing a depth map and/or disparity map based on the original plenoptic image; and
   computing the refocusing parameter from the depth map and/or the disparity map and from one or more refocusing user parameters.

10. A non-transitory computer-readable storage medium on which is stored code of an executable program that, when executed, causes a computer to execute each of the following steps:
    obtaining a compressed plenoptic image generated by compressing an original plenoptic image;
    obtaining a refocusing parameter;
    generating a first refocused image from the original plenoptic image using the refocusing parameter and generating a second refocused image from a decompressed plenoptic image using the refocusing parameter, the decompressed plenoptic image being obtained from the compressed plenoptic image;
    obtaining residual data corresponding to a difference between the first refocused image and the second refocused image; and
    outputting data comprising the compressed plenoptic image, the residual data and the refocusing parameter.

11. A method comprising:
    obtaining a compressed plenoptic image generated by compressing an original plenoptic image;
    obtaining a refocusing parameter;
    obtaining residual data corresponding to a difference between a first refocused image and a second refocused image, wherein the first refocused image is generated from the original plenoptic image using the refocusing parameter and the second refocused image is generated from a decompressed plenoptic image using the refocusing parameter, the decompressed plenoptic image being generated by decompressing the compressed plenoptic image;
    generating a refocused image from a decompressed plenoptic image using the refocusing parameter, the decompressed plenoptic image being obtained from the compressed plenoptic image; and
    generating an enhanced image from the generated refocused image using the residual data.

12. A computing device comprising:
    an obtaining module for obtaining a compressed plenoptic image generated by compressing an original plenoptic image;
    an obtaining module for obtaining a refocusing parameter;
    a generating module for generating a first refocused image from the original plenoptic image using the refocusing parameter and generating a second refocused image from a decompressed plenoptic image using the refocusing parameter, the decompressed plenoptic image being obtained from the compressed plenoptic image;
    an obtaining module for obtaining residual data corresponding to a difference between the first refocused image and the second refocused image; and
    an outputting module for outputting data comprising the compressed plenoptic image, the residual data and the refocusing parameter.

13. The device according to claim 12, further comprising a compressing module for compressing the outputted residual data.

14. The device according to claim 13, wherein a block DCT transformation algorithm is used to compress the residual data.

15. The device according to claim 13, wherein a quantization algorithm is used to compress the residual data.

16. The device according to claim 13, wherein an entropy encoding algorithm is used to compress the residual data.

17. The device according to claim 12, further comprising a storing module for storing in a memory the outputted data.

18. The device according to claim 12, wherein a compressing module for compressing the original plenoptic image uses vector quantization.

19. The device according to claim 12, wherein a compressing module for compressing the original plenoptic image uses an algorithm that is based on using an anchor.

20. The device according to claim 12, further comprising:
    a computing module for generating a depth map and/or disparity map based on the original plenoptic image; and
    a computing module for generating the refocusing parameter from the depth map and/or the disparity map and from one or more refocusing user parameters.

21. A computing device comprising:
    an obtaining module for obtaining a compressed plenoptic image generated by compressing an original plenoptic image;
    an obtaining module for obtaining a refocusing parameter;
    an obtaining module for obtaining residual data corresponding to a difference between a first refocused image and a second refocused image, wherein the first refocused image is generated from the original plenoptic image using the refocusing parameter and the second refocused image is generated from a decompressed plenoptic image using the refocusing parameter, the decompressed plenoptic image being generated by decompressing the compressed plenoptic image;
    a generating module for generating a refocused image from a decompressed plenoptic image using the refocusing parameter, the decompressed plenoptic image being obtained from the compressed plenoptic image, and for generating an enhanced image from the generated refocused image using the residual data.

* * * * *